(12) United States Patent
Niederberger

(10) Patent No.: US 11,089,419 B2
(45) Date of Patent: Aug. 10, 2021

(54) MICROPHONE AND METHOD OF TESTING A MICROPHONE

(71) Applicant: ams International AG, Rapperswil (CH)

(72) Inventor: Mark Niederberger, Einsiedeln (CH)

(73) Assignee: AMS INTERNATIONAL AG, Rapperswil (CH)

( * ) Notice: Subject to any disclaimer, the term of this patent is extended or adjusted under 35 U.S.C. 154(b) by 0 days.

(21) Appl. No.: 16/490,981

(22) PCT Filed: Feb. 26, 2018

(86) PCT No.: PCT/EP2018/054655
§ 371 (c)(1),
(2) Date: Sep. 4, 2019

(87) PCT Pub. No.: WO2018/166777
PCT Pub. Date: Sep. 20, 2018

(65) Prior Publication Data
US 2020/0015027 A1 Jan. 9, 2020

(30) Foreign Application Priority Data
Mar. 13, 2017 (EP) ..................................... 17160562

(51) Int. Cl.
*H04R 29/00* (2006.01)
*G01L 19/00* (2006.01)
(Continued)

(52) U.S. Cl.
CPC ........ *H04R 29/004* (2013.01); *G01L 19/0092* (2013.01); *H04R 1/04* (2013.01); *H04R 1/42* (2013.01); *H04R 19/04* (2013.01)

(58) Field of Classification Search
CPC . H04R 1/083; H04R 1/04; H04R 1/08; H04R 1/06; H04R 1/02; H04R 1/31;
(Continued)

(56) References Cited

U.S. PATENT DOCUMENTS 6,498,854 B1 * 12/2002 Smith ...................... A61B 7/04
381/67
2006/0289415 A1  12/2006 Muehlheim et al.
(Continued)

FOREIGN PATENT DOCUMENTS

CN   202103853 U   1/2012
CN   104902411     9/2015
(Continued)

OTHER PUBLICATIONS

European Patent Office, International Search Report for PCT/EP2018/054655 dated May 4, 2018.
(Continued)

*Primary Examiner* — Alexander Krzystan
*Assistant Examiner* — Julie X Dang
(74) *Attorney, Agent, or Firm* — MH2 Technology Law Group LLP

(57) ABSTRACT

The microphone comprises a housing (1, 2), which has an inner volume (12) filled with a gas, an opening (10) of the housing, an acoustic sensor (3) arranged in the housing, a diaphragm (13) of the acoustic sensor located above the opening, and a heater (14) in the inner volume. The acoustic sensor may especially comprise a microelectromechanical system. The gas is heated from inside the inner volume to increase the pressure and generate a corresponding signal of the acoustic sensor (3). This signal can be used for self-calibration of the sensitivity or for self-diagnostics to check the function of the microphone.

13 Claims, 4 Drawing Sheets

(51) Int. Cl.
*H04R 1/04* (2006.01)
*H04R 1/42* (2006.01)
*H04R 19/04* (2006.01)

(58) Field of Classification Search
CPC ........ B81B 2201/003; B81B 2201/057; B81B 2203/0127; B81B 2203/0163
USPC ........ 381/165, 174, 175, 190, 355, 369, 173
See application file for complete search history.

(56) References Cited

U.S. PATENT DOCUMENTS

| | | | | |
|---|---|---|---|---|
| 2007/0103697 | A1* | 5/2007 | Degertekin | G01Q 20/02 356/501 |
| 2010/0275675 | A1* | 11/2010 | Seppa | G01L 9/0041 73/24.01 |
| 2011/0170108 | A1* | 7/2011 | Degertekin | G01Q 60/38 356/454 |
| 2012/0319219 | A1 | 12/2012 | Diamond et al. | |
| 2013/0001765 | A1* | 1/2013 | Yaralioglu | H01L 23/345 257/704 |
| 2014/0053651 | A1* | 2/2014 | Besling | G01L 9/0016 73/702 |
| 2015/0256917 | A1* | 9/2015 | Schelling | H04R 1/028 381/111 |
| 2015/0304753 | A1* | 10/2015 | Loeppert | H04R 1/04 381/111 |
| 2015/0321906 | A1* | 11/2015 | Tsai | B81C 1/0023 257/416 |
| 2015/0365770 | A1* | 12/2015 | Lautenschlager | H04R 19/005 381/172 |
| 2016/0137486 | A1 | 5/2016 | Bharatan | |
| 2016/0150337 | A1* | 5/2016 | Nandy | G10L 21/0208 381/66 |
| 2016/0219378 | A1* | 7/2016 | Hall | H04R 19/04 |
| 2016/0377569 | A1 | 12/2016 | Rajaraman et al. | |
| 2017/0026729 | A1 | 1/2017 | Albers et al. | |
| 2017/0044008 | A1 | 2/2017 | Zinn et al. | |
| 2017/0238108 | A1 | 8/2017 | Muza | |
| 2018/0376537 | A1* | 12/2018 | Zandbergen | H01J 37/26 |

FOREIGN PATENT DOCUMENTS

| | | |
|---|---|---|
| CN | 105323686 A | 2/2016 |
| DE | 102005029841 | 3/2006 |
| DE | 102006013345 | 4/2009 |
| DE | 112015000345 | 9/2016 |
| DE | 102016208360 | 12/2016 |
| EP | 2503793 A1 | 9/2012 |
| JP | 2006-157837 A | 6/2006 |
| WO | WO2009/016587 A1 | 2/2009 |

OTHER PUBLICATIONS

China National Intellectual Property Administration, Office Action and Search Report, dated Jun. 17, 2020, 15 pages (English translation).

* cited by examiner

MICROPHONE AND METHOD OF TESTING A MICROPHONE

BACKGROUND OF THE INVENTION

Microphones of the same type differ in sensitivity owing to production tolerances or ageing. If an exact calibration is required, an external audio source is used to test and adjust the microphone. Such a test may be performed under different conditions and for different frequency ranges, according to the requirements, especially at the end of the manufacturing process and/or repeatedly at specified time intervals.

A microelectromechanical microphone comprises an acoustic sensor, which includes a microelectromechanical system (MEMS), and a control component, which may be an application-specific integrated circuit (ASIC). The acoustic sensor and the control component are mounted on a base, which is covered with a lid forming an internal chamber. The acoustic sensor is arranged above a sound port of the base or the lid and is electrically connected with the control component.

US 2016/0137486 A1 discloses a microelectromechanical microphone with an acoustic sensor comprising a substrate, a back plate including air channels, an isolation layer and a tensioned membrane. The tension is generated by applying an elevated temperature during the fabrication process.

US 2017/0026729 A1 discloses a microelectromechanical microphone with an integrated circuit coupled to a pressure sensor, which is part of the integrated circuit or mounted inside the lid forming the internal chamber, at a position opposite the integrated circuit.

US 2012/0319219 A1 discloses CMOS-MEMS microphones and a method of manufacturing a microphone using epitaxially grown silicon. The manufacture within a standard CMOS process allows to integrate mechanical and electrical components of the microphone in the same semiconductor chip.

US 2017/0044008 A1 discloses systems and methods for manufacturing a CMOS-MEMS device. A protective layer is deposited on a top surface of a layered structure to cover a logic region. Partial etches are performed in a MEMS region from the bottom side to form a gap below a membrane and from the top side to remove a portion of a sacrificial layer between the membrane and a backplate, so that the membrane is released. The protective layer prevents the logic components in the logic region from being etched and damaged.

DE 10 2006 013 345 B4 discloses a microphone without membrane. Two pulsed light rays of the same intensity are each emitted into a transparent plate to propagate by total internal reflection. One of the plates has a boundary surface to an ambient medium suitable to carry sound waves. The light ray propagating in this plate enters the ambient medium to a depth of approximately one wavelength when it is reflected at the boundary surface, so that attenuated total reflectance occurs. The intensity of the light ray is therefore modulated by density variations of the ambient medium, which are due to the sound waves. The modulated intensity is detected and compared with the intensity of the other light ray, which serves as a reference, as it is not exposed to the sound waves and hence not modulated. The detected signals can be evaluated by means of a differential amplifier, which yields an electric signal corresponding to the sound wave.

SUMMARY OF THE INVENTION

The microphone comprises a housing, which has an inner volume filled with a gas, an opening of the housing, an acoustic sensor arranged in the housing, a diaphragm of the acoustic sensor located above the opening and separating the inner volume from the opening, and a heater in the inner volume. The acoustic sensor may especially comprise a microelectromechanical system. The diaphragm may especially be a deflectable membrane or a transparent or semitransparent plate. The heater may be integrated in the acoustic sensor.

An embodiment of the microphone comprises an integrated circuit chip in the housing, and an electric connection between the integrated circuit chip and the acoustic sensor.

In a further embodiment of the microphone, the heater is integrated in the integrated circuit chip.

A further embodiment of the microphone comprises a heater chip in the housing, and the heater is integrated in the heater chip.

A further embodiment of the microphone comprises heater terminals on the housing outside the inner volume and further electric connections between the heater chip and the heater terminals.

Further embodiments of the microphone comprise a pressure sensor in the inner volume of the housing. The pressure sensor may especially be integrated in the acoustic sensor, in the integrated circuit chip or in the heater chip.

The method of testing a microphone is applied to a microphone having a housing with an opening, an inner volume of the housing filled with a gas having a pressure, and an acoustic sensor with a diaphragm separating the inner volume from the opening. The method comprises heating the gas from inside the inner volume, thus increasing the pressure of the gas, and detecting an output signal generated by the increase of the pressure. The output signal, which may especially be measured as an electric output signal, may be evaluated for a self-calibration or/and self-diagnostics of the microphone.

In a variant of the method the output signal is measured as an electric output signal of a deflectable membrane.

In a further variant of the method, a barrier is releasably attached to the opening, and a cavity is sealed with the barrier, the cavity being confined by the barrier and the membrane, so that the deflection of the membrane increases a further pressure in the cavity. The barrier is removed after testing the microphone for normal operation.

The method may include measuring the pressure in the inner volume when the gas is heated.

The following is a detailed description of examples of the microphone and the method in conjunction with the appended figures.

DETAILED DESCRIPTION

Figure 1:
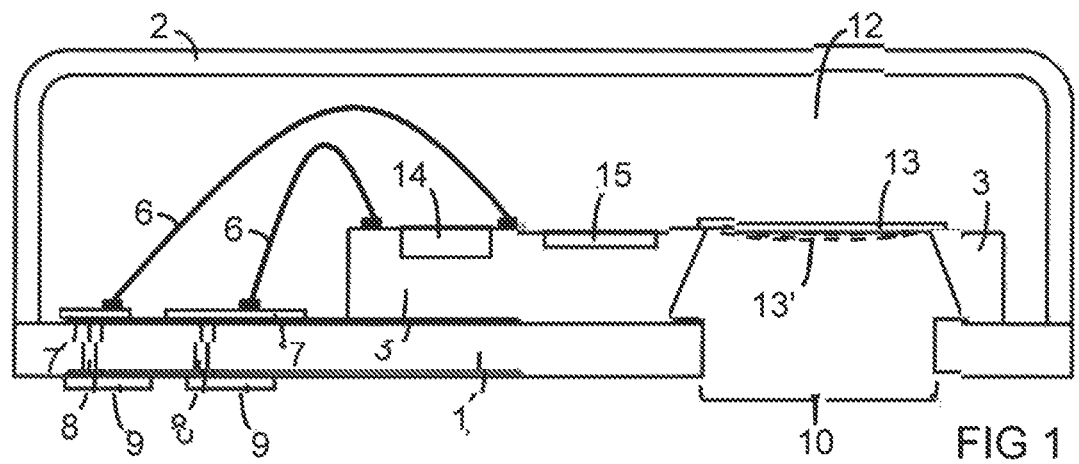
FIG. 1 is a cross section of a microphone with a heater integrated in an acoustic sensor.

FIG. 1 is a cross section of a microphone, which may in particular be a microelectromechanical microphone. A housing of the microphone may comprise more than one component, in particular a carrier 1, which may be a printed circuit board or a substrate, for instance, and a cover 2, which may be a lid, for instance. The housing forms an inner volume 12, which is filled with a gas.

An acoustic sensor 3 is arranged in the housing above an opening 10 of the housing, which provides access for an ambient medium and external sound signals. In the examples shown in the FIGS. 1 to 9, 11 and 12, the opening 10 is present in the carrier 1, but it may instead be formed in the cover 2. The acoustic sensor 3 may comprise a microelectromechanical system, which is known per se and not described in detail. The acoustic sensor 3 may include components of an electronic circuit for detecting and evaluating sensor signals, in particular CMOS components, for instance.

A membrane 13 of the acoustic sensor 3 separates the inner volume 12 and the opening 10, so that the gas filling the inner volume 12 is separated from the ambient medium. It is not required that the membrane 13 hermetically seal the inner volume 12. The membrane 13 may comprise small holes to allow the pressure of the gas filling the inner volume 12 to adapt to the pressure of the ambient medium.

Electric connections between the acoustic sensor 3 and conductor tracks 7 arranged on the carrier 1 may be formed by bonding wires 6, for instance. Interconnections 8 through the carrier 1 may electrically connect the conductor tracks 7 and contact pads 9 on the outer surface of the carrier 1.

An optional pressure sensor 15 may be arranged on or in the acoustic sensor 3. This is schematically indicated in FIG. 1. The pressure sensor 13 may especially be integrated in the acoustic sensor 3, and it may comprise a membrane similar to the membrane 13. If the acoustic sensor 3 is a microelectromechanical system, the membranes of the microphone and the pressure sensor may be formed in the same structured layer, for instance.

A heater 14 is arranged in the inner volume 12, so that the gas filling the inner volume 12 can be heated from inside the inner volume 12. In the example shown in FIG. 1, the heater 14 is integrated in the acoustic sensor 3. The heater 14 may be any heating device that is known per se in semiconductor technology, in particular a resistive heater formed by conductor tracks, for instance.

When the gas filling the inner volume 12 is heated by means of the heater 14, the pressure increases. The difference between the increased pressure of the gas and the pressure of the ambient medium causes the membrane 13 to deflect towards the opening 10. The deflected membrane 13' is schematically indicated in FIG. 1 by broken lines. By using the heater 14 it is possible to generate a deflection of the membrane 13 suitable for a test of the microphone, instead of a deflection of the membrane 13 caused by an acoustic signal from an external audio source.

Figure 2:
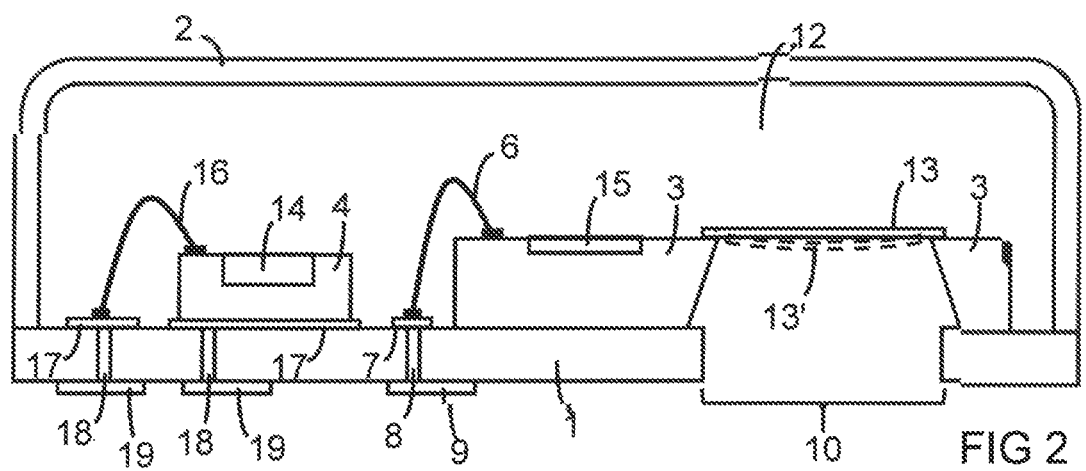
FIG. 2 is a cross section of a microphone according to FIG. 1 with a heater integrated in a separate heater chip.

FIG. 2 is a cross section of a further microphone comprising a heater 14. Elements of the microphone according to FIG. 2 that correspond to similar elements of the microphone according to FIG. 1 are designated with the same reference numerals. In the microphone according to FIG. 2, the heater 14 is integrated in a separate heater chip 4, which is arranged inside the inner volume 12. In the example shown in FIG. 2, the heater chip 4 is mounted on the carrier 1, in particular on a layer of further conductor tracks 17 applied on the carrier 1.

Further electric connections may be provided between the heater chip 4 and further contact pads 19 for external electric connections. The further electric connections may comprise further bonding wires 16, further conductor tracks 17 arranged on the carrier 1, and further interconnections 18 through the carrier 1, for example. The heater chip 4 may instead or additionally be connected to the acoustic sensor 3 by further bonding wires or further conductor tracks, for instance.

Figure 3:
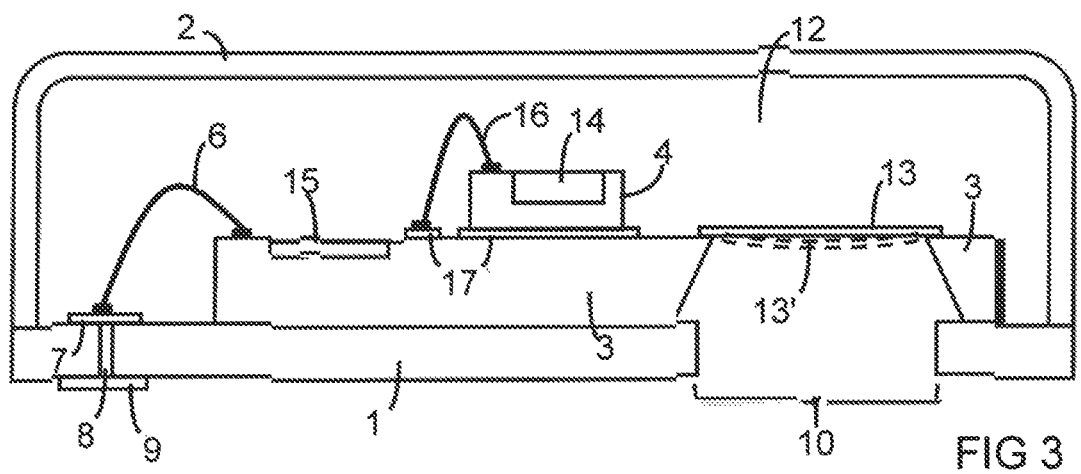
FIG. 3 is a cross section according to FIG. 2 with a different arrangement of the acoustic sensor and the chip.

FIG. 3 is a cross section of a further microphone comprising a heater 14. Elements of the microphone according to FIG. 3 that correspond to similar elements of the microphone according to FIG. 2 are designated with the same reference numerals. In the microphone according to FIG. 3, the heater chip 4 is mounted on the acoustic sensor 3. Further bonding wires 16 and further conductor tracks 17 may be provided for an electric connection between the acoustic sensor 3 and the heater chip 4.

A separate integrated circuit chip 5 may be arranged inside the housing, in particular in the inner volume 12, for the operation of the microphone and the evaluation of output signals. The integrated circuit chip 5 may especially be an application-specific integrated circuit (ASIC).

Figure 4:
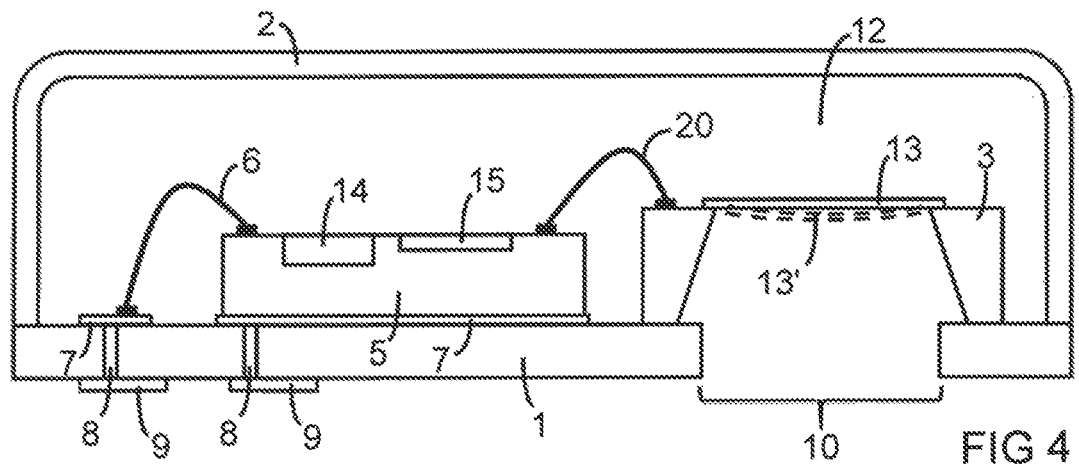
FIG. 4 is a cross section of a microphone with a heater integrated in an integrated circuit chip.

FIG. 4 is a cross section of a further microphone comprising a heater 14. Elements of the microphone according to FIG. 4 that correspond to similar elements of the microphone according to FIG. 1 are designated with the same reference numerals. In the microphone according to FIG. 4, the heater 14 is arranged in a separate integrated circuit chip 5. A pressure sensor 15 may optionally be integrated in the integrated circuit chip 5, as shown in FIG. 4. A pressure sensor may instead or additionally be integrated in the acoustic sensor 3.

An electric connection 20, which may comprise one or more bonding wires, for instance, connects the integrated circuit chip 5 and the acoustic sensor 3. Further electric connections may be provided between the integrated circuit chip 5 and/or the acoustic sensor 3 and contact pads 9 for external electric connections. The further electric connections may comprise bonding wires 6, conductor tracks 7 arranged on the carrier 1, and interconnections 8 through the carrier 1, for example. The contact pads 9 may be arranged on the outer surface of the carrier 1 as shown in FIG. 4.

Figure 5:
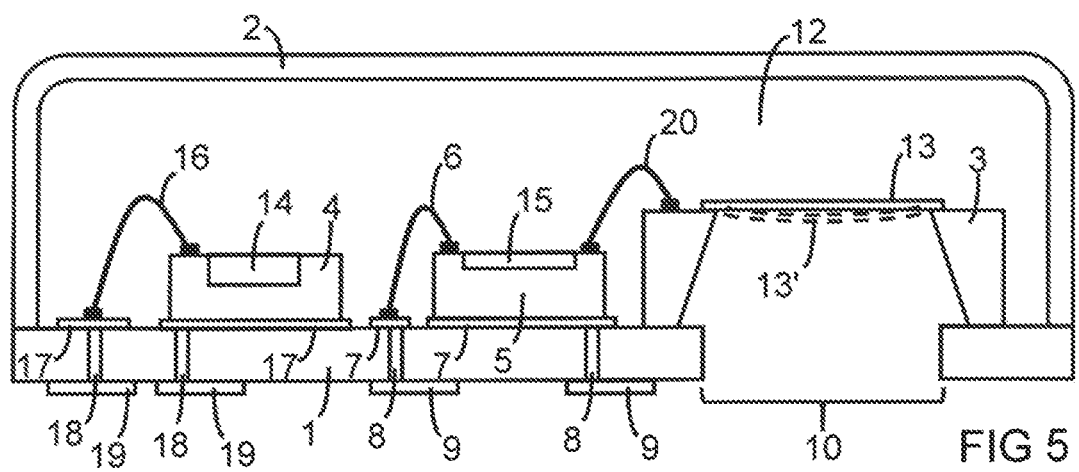
FIG. 5 is a cross section of a microphone according to FIG. 4 with a heater integrated in a separate heater chip.

FIG. 5 is a cross section of a further microphone comprising a heater 14. Elements of the microphone according to FIG. 5 that correspond to similar elements of the microphone according to FIG. 2 are designated with the same reference numerals. The microphone according to FIG. 5 comprises a separate integrated circuit chip 5, which is arranged inside the inner volume 12 of the housing. A pressure sensor 15 may optionally be integrated in the integrated circuit chip 5, as shown in FIG. 5. A pressure sensor may instead or additionally be integrated in the acoustic sensor 3. An electric connection 20, which may comprise one or more bonding wires, for instance, connects the integrated circuit chip 5 and the acoustic sensor 3.

In the microphone according to FIG. 5, the heater 14 is integrated in a separate heater chip 4, which is arranged inside the inner volume 12. In the example shown in FIG. 5, the heater chip 4 is mounted on the carrier 1, in particular on a layer of further conductor tracks 17 applied on the carrier 1.

Figure 6:
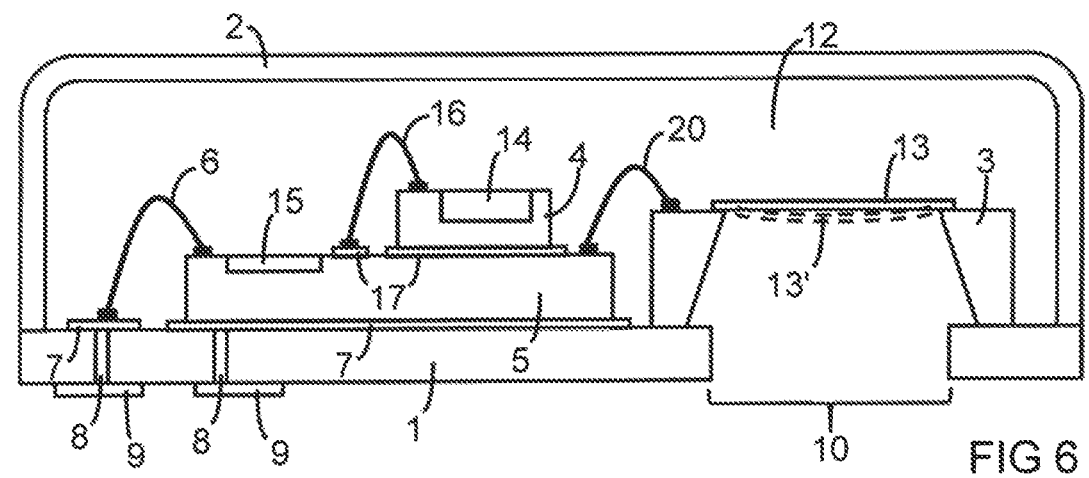
FIG. 6 is a cross section according to FIG. 5 with a different arrangement of the chips.

FIG. 6 is a cross section of a further microphone comprising a heater 14. Elements of the microphone according to FIG. 6 that correspond to similar elements of the microphone according to FIG. 3 are designated with the same reference numerals. The microphone according to FIG. 6 comprises a separate integrated circuit chip 5, which is arranged inside the inner volume 12 of the housing. A pressure sensor 15 may optionally be integrated in the integrated circuit chip 5, as shown in FIG. 5. A pressure sensor may instead or additionally be integrated in the acoustic sensor 3. An electric connection 20, which may comprise one or more bonding wires, for instance, connects the integrated circuit chip 5 and the acoustic sensor 3.

In the microphone according to FIG. 6, the heater 14 is integrated in a separate heater chip 4, which is arranged inside the inner volume 12. In the example shown in FIG. 6, the heater chip 4 is mounted on the integrated circuit chip 5. Further bonding wires 16 and further conductor tracks 17 may be provided for an electric connection between the integrated circuit chip 5 and the heater chip 4. The integrated circuit chip 5 may instead be mounted on the heater chip 4, and in this case the heater chip 4 may be mounted on the carrier 1.

Figure 7:
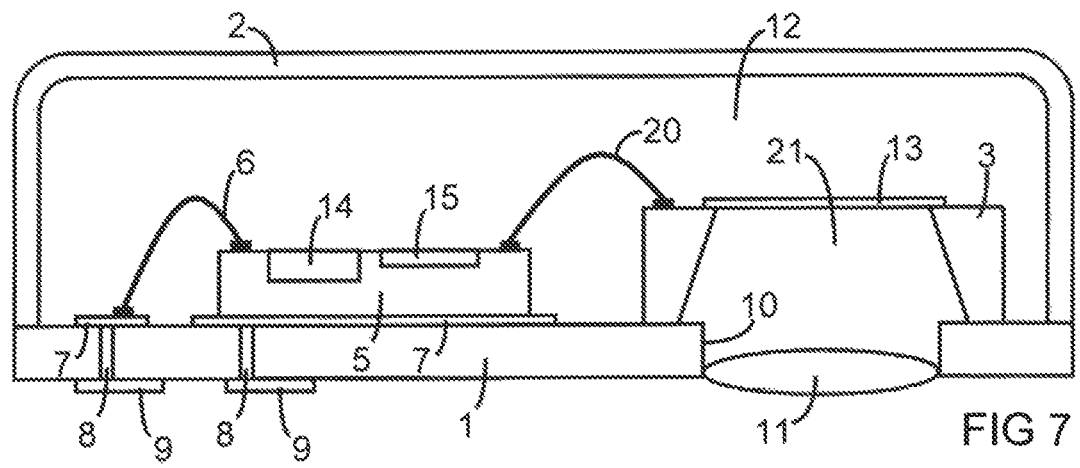
FIG. 7 is a cross section according to FIG. 4 with a barrier of the opening.

FIG. 7 is a cross section according to FIG. 4 and shows a barrier 11, which is temporarily and releasably attached to the opening 10. The barrier 11 seals the opening 10 and thus forms a cavity 21, which is sealed by the barrier 11 and the membrane 13. The barrier 11 separates the ambient medium from the membrane 13 and thus prevents the outer surface of the membrane 13 from being exposed to the ambient pressure.

As long as the barrier 11 is in place, the pressure in the cavity 21 increases when the membrane 13 deflects towards the opening 10. Thereby the deflection of the membrane 13 is reduced, because the increased pressure in the inner volume 12 is at least partially balanced by the increased pressure in the cavity 21. Thus the barrier 11 allows to reduce the output signal of the microphone during the test.

Figure 8:
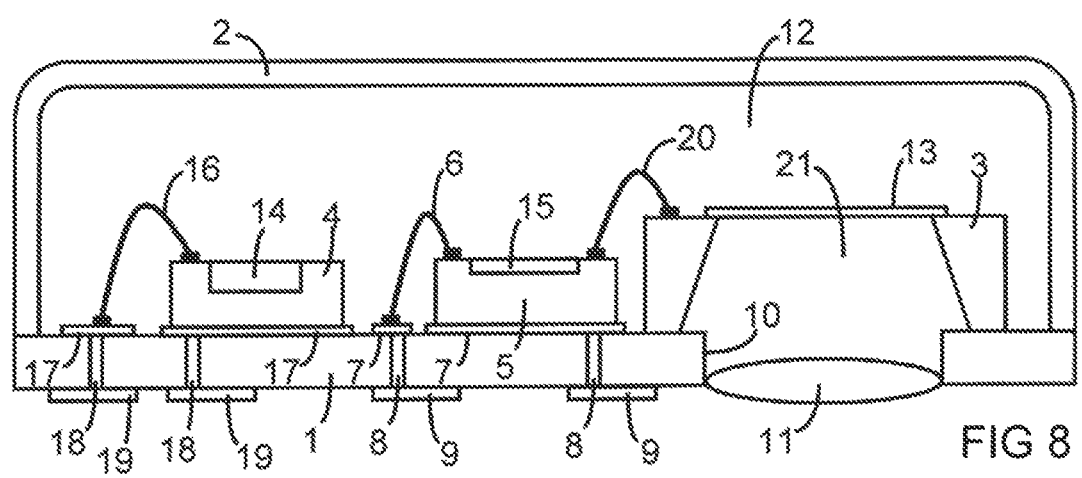
FIG. 8 is a cross section according to FIG. 5 with a barrier of the opening.
Figure 9:
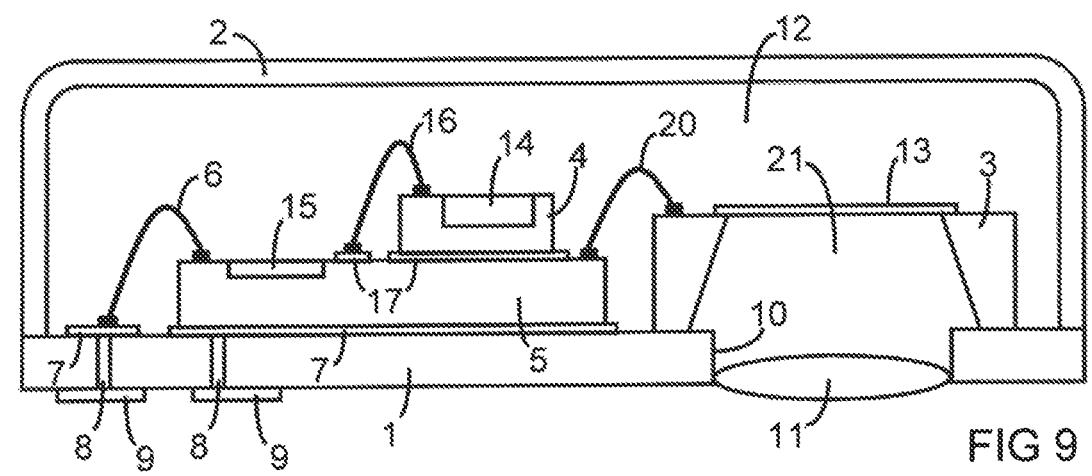
FIG. 9 is a cross section according to FIG. 6 with a barrier of the opening.

FIGS. 8 and 9 are cross sections according to FIGS. 5 and 6 and show a barrier 11, which is temporarily and releasably attached to the opening 10 for the purpose described above in conjunction with FIG. 7. A similar barrier may temporarily and releasably attached to the opening 10 of the microphones according to FIGS. 1 to 3.

Figure 10:
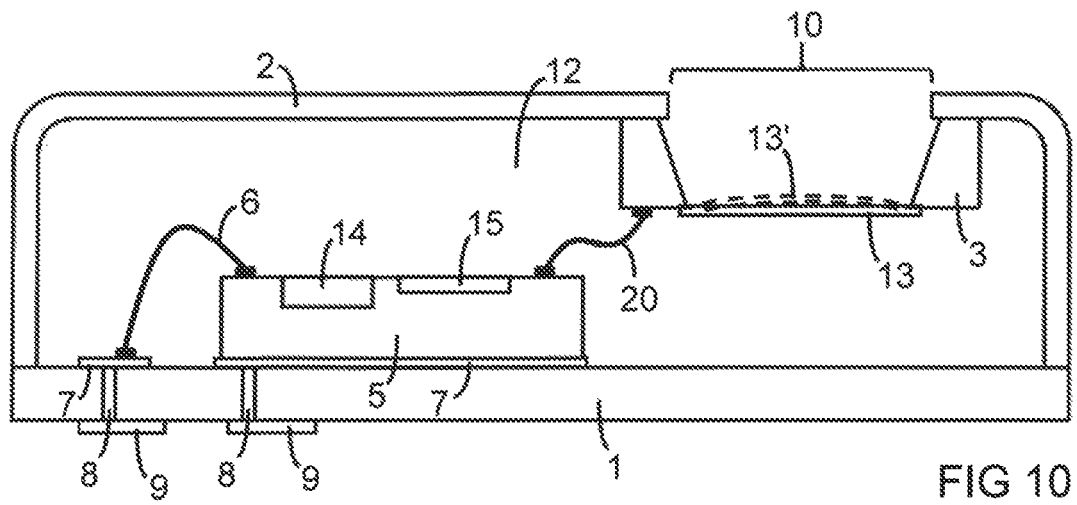
FIG. 10 is a cross section according to FIG. 4 with a different arrangement of the acoustic sensor.

FIG. 10 is a cross section of a further microphone comprising a heater 14. Elements of the microphone according to FIG. 10 that correspond to similar elements of the microphone according to FIG. 4 are designated with the same reference numerals. In the microphone according to FIG. 10, the opening 10, which provides access for an ambient medium and external sound signals, is formed in the cover 2. The acoustic sensor 3 is arranged above the opening 10 and is therefore mounted to the cover 2. In the microphones according to FIGS. 1 to 3, 5 to 9, 11 and 12, the opening 10 and the acoustic sensor 3 may also be arranged in a manner similar to the arrangement shown in FIG. 10.

Figure 11:
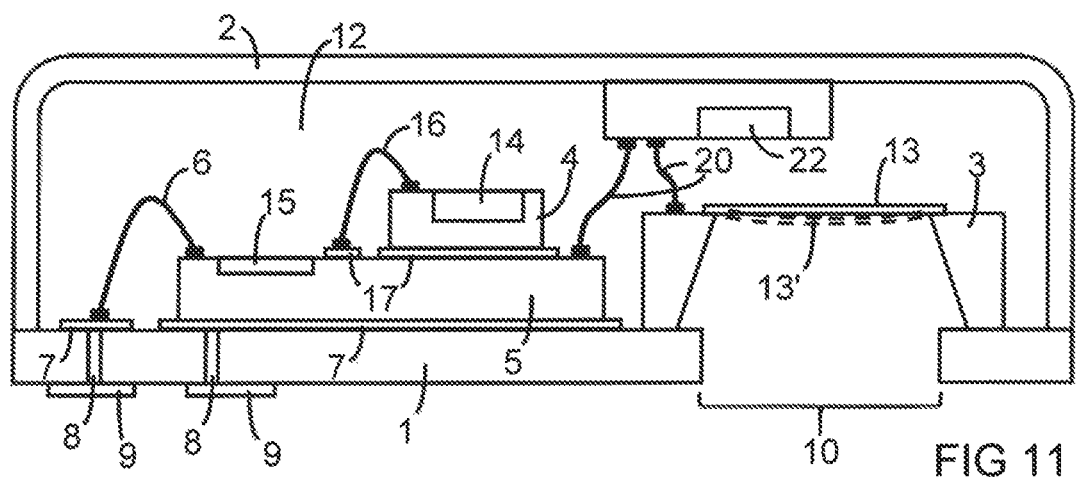
FIG. 11 is a cross section according to FIG. 6 with a further sensor.

FIG. 11 is a cross section of a further microphone comprising a heater 14. Elements of the microphone according to FIG. 11 that correspond to similar elements of the microphone according to FIG. 6 are designated with the same reference numerals. In the microphone according to FIG. 11, a further sensor is arranged in the inner volume 12 of the housing. The further sensor may be a temperature sensor 22, for instance. The further sensor 22 may be present additionally to the pressure sensor 15 or instead of the pressure sensor 15.

In FIG. 11, the further sensor 22 is applied to the cover 2, but the further sensor 22 may instead be mounted on the carrier 1. An electric connection 20, which may comprise one or more bonding wires, for instance, can be applied to connect the further sensor 22 with the integrated circuit chip 5 and/or the acoustic sensor 3. Other sensors of ambient or environmental conditions like gas sensors, for instance, may also be arranged in the inner volume 12. Further sensors may also be arranged in the microphones according to FIGS. 1 to 5, 7 to 10 and 12.

Figure 12:
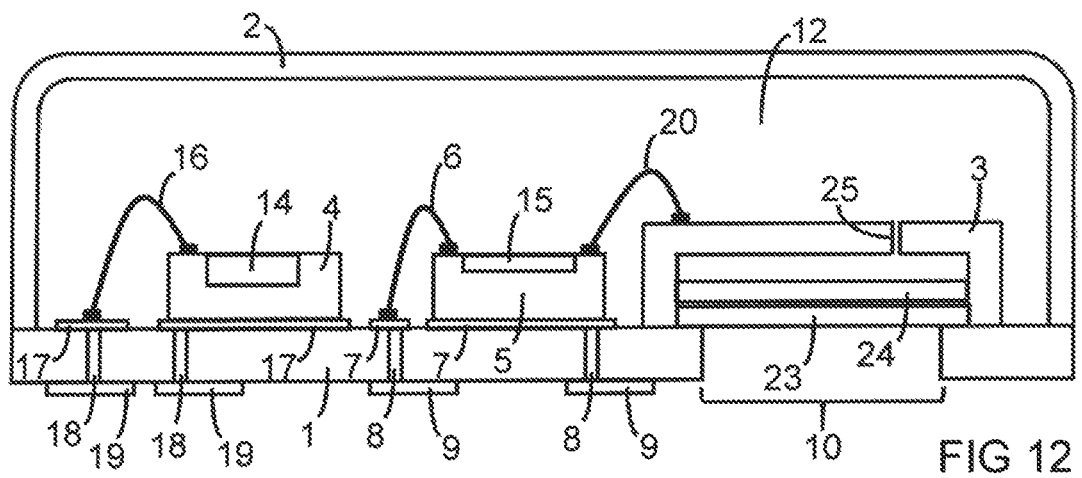
FIG. 12 is a cross section according to FIG. 5 with a different type of acoustic sensor.

FIG. 12 is a cross section of a further microphone comprising a heater 14. Elements of the microphone according to FIG. 12 that correspond to similar elements of the microphone according to FIG. 5 are designated with the same reference numerals. In the microphone according to FIG. 12, the acoustic sensor 5 does not comprise a membrane. Instead, attenuated total reflectance is employed to sense acoustic phenomena.

In the microphone according to FIG. 12, two pulsed light rays of the same intensity are each emitted into a transparent or semitransparent plate 23, 24 to propagate by total internal reflection. One of the plates 23 has a boundary surface toward the opening 10, which provides access for an ambient medium. The intensity of the light ray propagating in this plate 23 is modulated by density variations of the ambient medium. The modulated intensity is detected and compared with the intensity of the other light ray, which propagates in the further plate 24 and is not exposed to the ambient medium.

The detected signals can be evaluated by means of a differential amplifier, which can be integrated in the acoustic sensor 3. The outer case of the acoustic sensor 3 of the microphone according to FIG. 12 may comprise a vent 25, which allows the pressure of the gas inside the acoustic sensor 3 at the further plate 24 to adapt to the pressure of the gas filling the inner volume 12 of the housing around the acoustic sensor 3. An acoustic sensor 3 without membrane may also be employed in the microphones according to FIGS. 1 to 4 and 6 to 11.

In the method of testing the microphone, the gas is heated from inside the inner volume 12, in particular by using the heater 14, thus increasing the pressure in the inner volume. In the microphones according to FIGS. 1 to 11, the increase of the pressure causes a corresponding deflection of the membrane 13. The deflection of the membrane 13 generates an output signal, in particular an electric output signal of the microphone. In the microphone according to FIG. 12, the reference value provided by the intensity of the light ray propagating in the further plate 24 is modified by the increase of the pressure. This response can be used for self-calibration of the sensitivity or for self-diagnostics to check the function of the microphone.

The pressure in the inner volume 12 can be detected by a pressure sensor 15. The value of the pressure can be used in the evaluation of the sensitivity of the microphone.

If a barrier 11 is temporarily applied to the opening 10 of the microphone during the heating process, the deflection of the membrane 13 is inhibited by the increasing counterpressure and the output signal is accordingly reduced.

The sound pressure level is a logarithmic measure of the effective pressure of a sound relative to a reference value. If $p_{rms}$ is the root mean square sound pressure and $p_0$ is the reference value, the corresponding sound pressure level $L_p$ measured in dB is defined by $L_p(\text{re } p_0)=20\cdot\log_{10}(p_{rms}/p_0)$ dB.

The reference value $p_0$ for sound in air has been defined as $p_0=20$ µPa, so that $L_p$ (re 20 µPa)=$20\cdot\log_{10}$ ($p_{rms}/20$ µPa)dB. For $p_{rms}=1$ Pa, for instance, the sound pressure level is 93.9794 dB. Hence a microelectromechanical microphone, which has a typical sensitivity of about 12.6 mV/Pa, can suitably be tested by making it respond to a sound pressure level of 94 dB. For this purpose the temperature of the gas filling the inner volume 12 is increased by typically about 2.7 mK.

The deflection of the membrane 13 is very small during the heating of the gas, so that the inner volume 12 remains essentially constant. The same is true in the microphone according to FIG. 12, because the plate 23 can be made essentially rigid. The gas is supposed to behave as an ideal gas, and any spatial temperature differences occurring in the inner volume 12 during heating are considered as negligible. Under these conditions the temperature T and the pressure p of the gas are proportional: T~p (Amontons's law). If $T_1$ and $p_1$ are the temperature and the pressure before heating and $T_2$ and $p_2$ are the temperature and the pressure after heating, the increase of the temperature is $T_2-T_1=[(p_2-p_1)/p_1]\cdot T_1$. The desired increase of the pressure is $p_2-p_1=1$ Pa. If standard conditions for temperature and pressure are assumed to be initially present in the inner volume 12, which means $T_1=273.15$ K and $p_1=105$ Pa, the required increase in temperature is $10^{-5}\cdot 273.15$ K=2.7315 mK.

The described method has the advantage that no external audio source is required. This allows essentially inaudible self-calibration and/or self-diagnostics of the microphone.

I claim:

1. A microphone, comprising:
    a housing, an inner volume of the housing being filled with a gas;
    an opening of the housing;
    an acoustic sensor in the housing;
    a diaphragm of the acoustic sensor above the opening, the diaphragm being a deflectable membrane and separating the inner volume from the opening; and
    a heater in the inner volume, the heater being configured to cause the diaphragm to deflect towards the opening by increasing the pressure of the gas by heating, such that an electric output signal of the deflectable membrane is generated.

2. The microphone of claim 1, further comprising:
    an integrated circuit chip in the housing; and
    an electric connection between the integrated circuit chip and the acoustic sensor.

3. The microphone of claim 1, wherein the heater is integrated in the acoustic sensor.

4. The microphone of claim 2, wherein the heater is integrated in the integrated circuit chip.

5. The microphone of claim 1, further comprising:
    a heater chip in the housing, the heater being integrated in the heater chip.

6. The microphone of claim 1, further comprising:
    a pressure sensor in the inner volume of the housing.

7. The microphone of claim 1, wherein the diaphragm is a transparent or semitransparent plate.

8. The microphone of claim 1, wherein the acoustic sensor is a microelectromechanical system.

9. A method of testing a microphone having a housing with an opening, an inner volume of the housing being filled with a gas having a pressure, and an acoustic sensor with a diaphragm separating the inner volume from the opening, the diaphragm being a deflectable membrane, the method comprising:
    heating the gas from inside the inner volume, thus increasing the pressure of the gas, wherein increasing the pressure of the gas causes the diaphragm to deflect towards the opening;
    detecting an output signal generated by the increase of the pressure, wherein the output signal is measured as an electric output signal of the deflectable membrane; and
    evaluating the output signal generated by the increase of the pressure for a self-calibration or/and self-diagnostics of the microphone.

10. The method according to claim 9, further comprising:
    releasably attaching a barrier to the opening; and
    sealing a cavity with the barrier, the cavity being confined by the barrier and the membrane, so that the deflection of the membrane increases a further pressure in the cavity.

11. The method according to claim 10, further comprising:
    removing the barrier after testing the microphone.

12. The method according to claim 9, further comprising:
    measuring the pressure in the inner volume when the gas is heated.

13. The method according to claim 9, further comprising:
    evaluating the output signal generated by the increase of the pressure for a self-calibration or/and self-diagnostics of the microphone.

* * * * *